United States Patent
Monk et al.

(10) Patent No.: US 8,055,584 B2
(45) Date of Patent: Nov. 8, 2011

(54) SYSTEMS AND METHODS FOR FRAUD MANAGEMENT IN RELATION TO STORED VALUE CARDS

(75) Inventors: Justin Monk, Omaha, NE (US); Denise Keay, Omaha, NE (US); Nathan Darmento, Omaha, NE (US); Jan Rhode, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 1568 days.

(21) Appl. No.: 10/690,394

(22) Filed: Oct. 20, 2003

(65) Prior Publication Data
US 2005/0086166 A1  Apr. 21, 2005

(51) Int. Cl.
*G06Q 40/00* (2006.01)
(52) U.S. Cl. .......................................... 705/41; 705/35
(58) Field of Classification Search ............... 705/38, 705/36, 44, 18, 39–41, 35; 235/380, 379; 382/116, 119
See application file for complete search history.

(56) References Cited

U.S. PATENT DOCUMENTS

| | | | |
|---|---|---|---|
| 5,710,886 A * | 1/1998 | Christensen et al. | 705/14 |
| 5,870,718 A * | 2/1999 | Spector | 705/26 |
| 5,895,453 A * | 4/1999 | Cook | 705/22 |
| 6,094,643 A * | 7/2000 | Anderson et al. | 705/44 |
| 6,240,397 B1 * | 5/2001 | Sachs | 705/27 |
| 6,330,544 B1 * | 12/2001 | Walker et al. | 705/14 |
| 6,467,685 B1 * | 10/2002 | Teicher | 235/379 |
| 6,714,918 B2 * | 3/2004 | Hillmer et al. | 705/18 |
| 2002/0025062 A1 * | 2/2002 | Black | 382/116 |
| 2003/0046222 A1 * | 3/2003 | Bard et al. | 705/38 |
| 2003/0174823 A1 * | 9/2003 | Justice et al. | 379/145 |
| 2003/0187783 A1 * | 10/2003 | Arthus et al. | 705/39 |
| 2003/0188158 A1 * | 10/2003 | Kocher | 713/161 |

* cited by examiner

Primary Examiner — Thu Thao Havan
(74) Attorney, Agent, or Firm — Kilpatrick Townsend & Stockton, LLP

(57) ABSTRACT

Systems and methods for monitoring and/or preventing fraud in relation to account acquisition. In some cases, this account acquisition is ongoing in relation to stored value accounts. Some of the methods provide for receiving suspicious activity indications from one or more issuer analysis engines that are operable to monitor activities occurring in relation to various stored value products. A global negative file is maintained including an update of various of the suspicious activities. An activity request is received from a user in relation to a stored value account, and the activity is checked against the global negative file. A response is generated based at least in part on the information accessible from the global negative file.

10 Claims, 8 Drawing Sheets

312 — Override Velocity Check Details

Velocity Settings

Override Velocity Checks:

Load Source Velocity by Amount

Amount Per Load Source Velocity (in dollars): 5

Amount Per Load Source Period (in days): 1

Amount Per Load Source Reason: Dollar Amount Velocity Exceeded

Load Source Velocity by Usage

Load Source Velocity Count: 5

Load Source Period (in days): 1

Load Source Velocity Reason: Load Source Velocity

Velocity on Phone Number

Home Phone Velocity Count: 5

Home Phone Period (in days): 1

Home Phone Velocity Reason: Home Phone Velocity

Work Phone Velocity Count: 5

Work Phone Period (in days): 1

Work Phone Velocity Reason: Work Phone Velocity

Velocity on Address

Address Velocity Count: 5

```
www.my.bankcsr.com@srvsun4a.fdcsg.1dc.com
08/05/03 01:56 PM
To:     nathan.darnento@firstdatacorp.com,
joan.rhode@firstdatacorp.com, dennis.guetterman@firstdatacorp.com,
michael.a.martinez@firstdatacorp.com, lakshmi.anupindi@firstdatacorp.com
        cc:
        bcc:
Subject:   Fraud Alert The following account is found to be fraudulent during the purchase of Gift Card
from www.mybankgiftcards.com. Please login to the reporting site and analyze
further to make decisions.

Order Date: Tue, Aug 5, '03
Product Type: GTCD
Purchaser Name smith, tyrone
Account Number 4820700100903306
Amount $40.00
Address 536 AUTUMN GLEN RD
City COLUMBIA
State and Zip SC - 29229
Deny Reason TOO MANY CARDS ORDERED Related Gift Cards    4170040037801224
4170040037801232
4170040037801240
4170040037801257

Please login to http://ecsrptcat.firstdataclients.com/FirstDefender for First
Defender Web Site.
```

Fig. 5

Fraud Queue

| Order Date | Account Number | Deny Reason | Queue Reviewed | Reviewer Notes |
|---|---|---|---|---|
| 08.01.2003 15:36:26 | 4851515700219438 | TOO MANY CARDS ORDERED | No | Verification notes here... |
| 08.01.2003 12:39:38 | 4011041000016306 | TOO MANY CARDS ORDERED | No | |
| 08.01.2003 12:33:13 | 4011041000016306 | fraud address | No | |
| 07.31.2003 16:00:24 | 9999999999999999 | bad address | No | |
| 07.31.2003 15:58:25 | 9999999999999999 | bad address | No | |
| 07.31.2003 15:56:27 | 2222222222222222 | null | No | |
| 07.31.2003 15:52:42 | 4237950009848766 | null | No | |
| 07.31.2003 15:47:01 | 4237950009848766 | null | No | |
| 07.31.2003 14:32:04 | 4237950009848766 | null | No | |
| 07.31.2003 10:43:42 | 4094274800027104 | fraud address | No | |
| 07.31.2003 10:15:23 | 4701116000072791 | fraud address | No | |
| 07.31.2003 10:01:36 | 4701116000074938 | fraud account | No | |
| 07.30.2003 14:47:23 | 8888888888888888 | Invalid Account | No | |
| 07.30.2003 13:53:41 | 8888888888888888 | Invalid Account | No | |
| 07.30.2003 11:42:50 | 8888888888888888 | Invalid Address | No | |
| 07.29.2003 16:53:13 | 4734574600000011 | TOO MANY CARDS ORDERED | No | |
| 07.29.2003 16:12:19 | 4734574600000011 | HOME PHONE USED TOO OFTEN | No | |
| 07.29.2003 16:03:08 | 4388130070001952 | TOO MANY CARDS ORDERED | No | |
| 07.29.2003 14:48:52 | 4820700100903306 | fraudulant number | No | |
| 07.29.2003 14:45:52 | 4820700100903306 | Deny BIN | No | |

Fig. 6

Related Accounts

Fraud Record

| Purchaser Information | | | |
|---|---|---|---|
| Purchaser Name: | test, tlp zero | Name: | davidson, harley |
| Purchaser Account Number: | 4011041000016306 | Address | 2006 ATWOOD AVE |
| Address | 560 CARILLON PKWY. | City, State, Zip: | OMAHA NE - 68108 |
| City, State, Zip: | FL - 33716 | Home Phone: | 4027773576 |

Deny Reason: TOO MANY CARDS ORDERED — 715

Reviewer Notes: Verification notes here... — 725

Queue Reviewed: □ — 720

Click the Check Boxes below to update the Neg File. Verify the Updates on the Neg File. — 730

□ Update Account Neg File — 732
□ Update Bin File — 734
□ Update Address Neg File — 736
□ Update Home Phone Neg File — 738

[Update Queue] — 740        [Override Velocity] — 750

Related Accounts — 760

| Order Date | Purchase Account Number | Gift Card Account | Gift Card Amount | Account Freeze? |
|---|---|---|---|---|
| 08.01.2003 12:39:16 | 4170040037801174 | 4011041000016306 | 30.00 | No |
| 08.01.2003 12:38:55 | 4170040037801166 | 4011041000016306 | 30.00 | No |

Fig. 7

SYSTEMS AND METHODS FOR FRAUD MANAGEMENT IN RELATION TO STORED VALUE CARDS

BACKGROUND OF THE INVENTION

The present invention provides systems and methods related to approving the loading, re-loading, and/or use of stored value cards.

In a standard commercial transaction, a purchaser supplies a credit card, cash, or a check as value that is exchanged for a purchased good. Where a check bounces, the credit card is stolen or otherwise invalid, or the cash is counterfeit, the merchant sustains a loss. This loss is often built into the margin of goods being sold. Thus, a merchant can sustain some level of losses due to fraudulent behavior.

There is often no margin or very little margin in the sales of gift cards. This is because a gift card is typically loaded with a cash balance equal to an amount tendered from a purchaser of the gift card. Thus, where a fraudulent form of value is presented in exchange for a gift card, it is similar to a merchant exchanging a real bill for a counterfeit bill of the same denomination. Accordingly, there exists a need in the art for advanced systems and methods for monitoring behavior ongoing in relation to gift cards and other stored value cards, and/or advanced systems and methods to prevent fraudulent activity performed in relation to such stored value cards.

BRIEF SUMMARY OF THE INVENTION

Some embodiments of the present invention provide systems and methods that can detect suspicious activity occurring in relation to one or more stored value products, and/or initiate measures operable to reduce the occurrence of any fraudulent behavior. Thus, for example, such embodiments can allow an issuer to identify and take action against suspicious load, enrollment and reload transactions. Further, in some embodiments, the present invention provides an ability to analyze transactions across a number of stored value products that can in some cases be offered by more than one issuer.

Particular embodiments of the present invention provide account acquisition fraud management systems that include two or more analysis engines, each associated with a particular stored value product. Account acquisition can include any efforts to secure an account with one or more entities. These analysis engines are responsible for monitoring activities ongoing local to the particular stored value product. Such systems further include a cross monitor that is operable to accept transaction information from one or more analysis engines, and to provide a convenient access point for the transaction information. In this way, suspicious activity detected in relation to one analysis engine can be used to detect suspicious activity ongoing across stored value products and/or across multiple issuers. Thus, for example, transaction information gathered in relation to one analysis engine can be applied to authorizing a transaction associated with a stored value card unrelated to the analysis engine from which the gathered transaction engine was received. In some cases, these systems can include some centralized database that maintains a group of transaction information. This transaction information can be graduated out of the system where it is not accessed or used for a period of time and/or where it is found to be less relevant to detecting fraudulent activities.

In various cases, the suspicious activity can be a threshold velocity of transactions performed in relation to stored value cards. Thus, for example, suspicious activity may be defined to include the purchase of more than a preset number of stored value cards from the same load source, the purchase of more than a preset dollar amount of stored value cards that are sent to a given physical address, the purchase of more than a preset amount of stored value cards associated with a given telephone number and/or virtual address, and/or some combination thereof or the like. These velocities can be calculated in relation to one particular stored value product, or across a number of stored value products and/or issuers.

In some instances, a queue is formed in relation to each issuer and/or stored value product. This queue can be used to hold a request for more information. Thus, for example, where suspicious activity is detected in relation to a stored value product, the suspicious activity can be identified in the queue, and the issuer with access to the queue can monitor the information therein and approve or decline the continuance of such activity. In some cases where the issuer fails to authorize the transaction within a predetermined time period, the information in the queue is cleared, and the transaction is declined.

Other embodiments of the present invention provide methods for detecting fraud in relation to stored value products. Such methods include receiving suspicious activity indications from various issuer analysis engines. These issuer analysis engines are operable to monitor activities occurring in relation to stored value products associated with the respective issuers. The suspicious activity indications are maintained in a global negative file. Such a global negative file can include suspicious activity across issuers, and/or across stored value products. An activity request including transaction information is received from one of the issuer analysis engines. Based at least in part on the transaction information, the global negative file is accessed and a response is provided indicating that the transaction information is related to suspicious behavior. In some cases, this response can be provided to a queue associated with one or more issuers to which the response is relevant. The response can include various of the following information: a date of the suspicious behavior, a funding account number, a denial reason, a review status, an indication of related accounts, and/or a reviewer note. Further, in some cases, this transaction information is used to create a velocity, and in turn, the velocity can be used to detect suspicious activity.

Yet other embodiments of the present invention provide systems for suppressing fraudulent activity in relation to stored value products. These systems include a first load monitor associated with a first issuer; a second load monitor associated with a second issuer; a first enrollment monitor associated with the first issuer; a second enrollment monitor associated with the second issuer; and a cross monitor. The cross monitor is operable to accept information from one or more of the first load monitor, the second load monitor, the first enrollment monitor, and the second enrollment monitor. Based at least in part on this information, the cross monitor is operable to communicate suspicious activity to both the first issuer and the second issuer. In some cases, the enrollment and/or load monitors are operable to apply a velocity check to respective load and enrollment requests. This check can be used to compare a velocity with a predefined velocity limit, and where the predefined velocity limit is exceeded, a suspicious activity flag or indication can be set.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 4 illustrates a velocity control interface in accordance with some embodiments of the present invention;

FIG. 5 illustrates an exemplary suspicious behavior response;

FIG. 6 illustrates a fraud queue interface in accordance with particular embodiments of the present invention; and FIG. 7 illustrates a related accounts information interface in accordance with particular embodiments of the present invention.

DETAILED DESCRIPTION OF THE INVENTION

Figure 1:
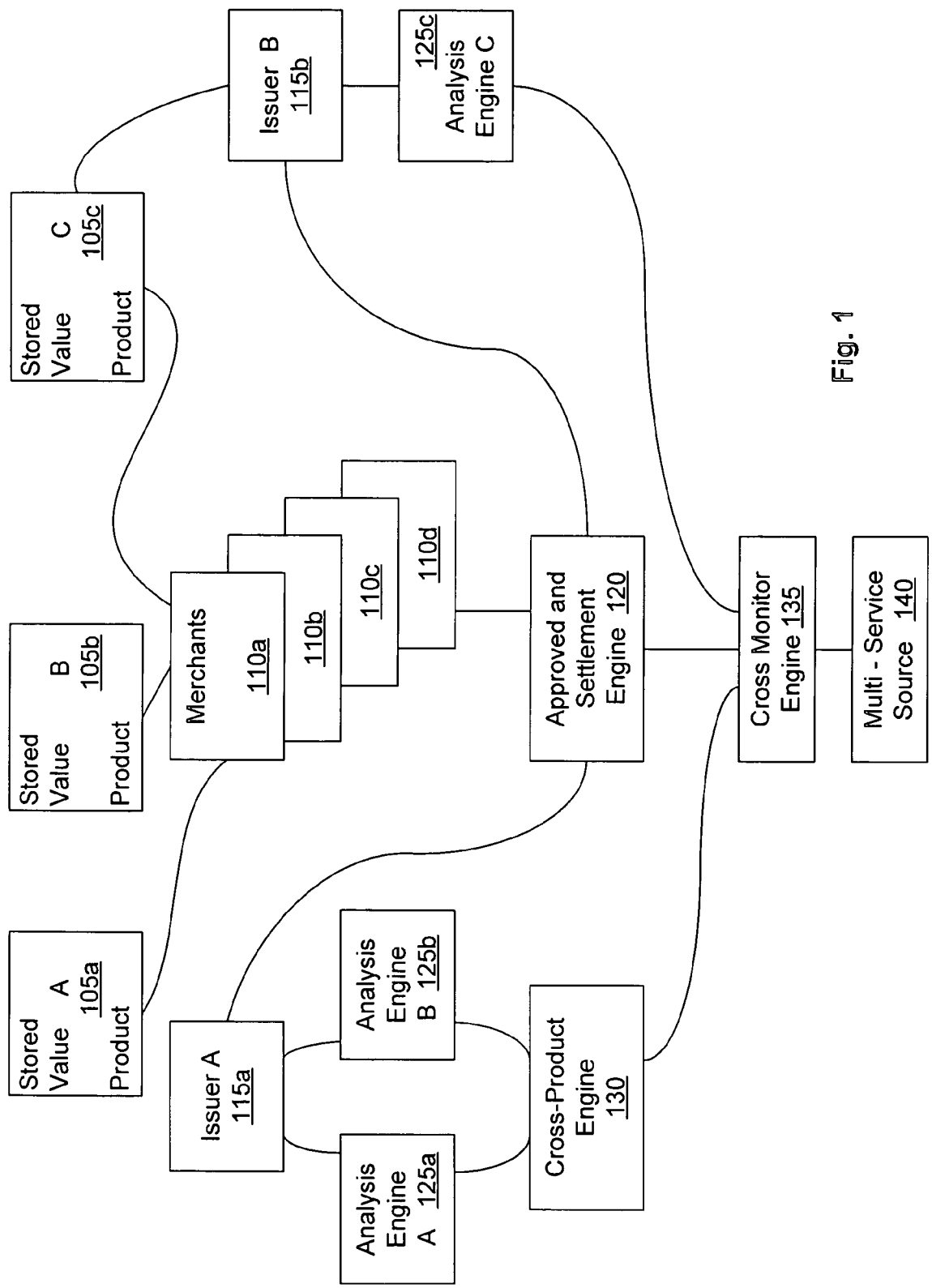
FIG. 1 is a diagram of a fraud detection and/or prevention system in accordance with some embodiments of the present invention.

Some embodiments of the present invention provide systems and methods that can detect suspicious activity occurring in relation to one or more stored value products, and/or initiate measures operable to reduce the occurrence of any fraudulent behavior. Thus, for example, such embodiments can allow an issuer to identify and take action against suspicious load, enrollment and reload transactions. Further, in some embodiments, the present invention provides an ability to analyze transactions across a number of stored value products that can in some cases be offered by more than one issuer. As used herein, a stored value product can be any product that allows for the loading and unloading of value. Thus, for example, a stored value product can be a gift card redeemable at a particular retailer, a calling card including a number of minutes, a virtual value account that can include value for purchase of a particular class of goods, or the like.

In an exemplary embodiment of the present invention, a four-pronged approach to fraud prevention is implemented. This four-pronged approach includes a load analysis engine, an enrollment analysis engine, a cross monitor, and a response queue. The load and enrollment analysis engines are generically referred to herein as analysis engines, and in general, these analysis engines can be any microprocessor based system capable of monitoring ongoing activity and/or authorizing activity in relation to a stored value product.

In particular, a load analysis engine inspects transaction involving the loading of funds onto a stored value card. Thus, for example, a load analysis engine can monitor an initial value load onto a stored value card, and/or a reload or addition of funds to a stored value card. During load processes, information about a purchaser can be garnered, and one or more portions of this information can be compared against information previously associated with fraudulent behavior and/or used to determine previously undetected fraudulent behavior. The information used for comparison may identify individuals involved in fraudulent behavior, addresses and telephone numbers associated with fraudulent behavior, purchase accounts and/or merchants associated with fraudulent behavior. This comparison information can be gathered from one or more stored value card issuers, credit card issuers, insurance companies, merchants, money transfer services, and/or the like. Such systems can reduce the probability that an individual and/or funding source associated with a successful transaction has been involved in fraudulent behavior in the past.

Similar to the aforementioned load analysis engine, the enrollment analysis engine inspects transaction information related to opening a stored value account. An enrollment analysis engine and a load analysis engine can be implemented as a common analysis engine, or apart as separate analysis engines. Such an enrollment analysis engine provides real time and batch screening for enrollment data related to suspicious transactions. These processes can be tailored for trapping activities performed by individuals to deceive or overcome known fraud controls. Thus, for example, enrollment analysis engines in accordance with the present invention can be implemented to identify multiple purchases associated with a single load source, single recipient's address, single purchaser's address, and/or a telephone number or virtual address for either purchasers or recipients. Further, address variants can be checked to assure that two or more spellings or indications of a common address are not being used to avoid detection. Also, high dollar amount transactions can be monitored, as well as transactions occurring with dollar amounts slightly below known thresholds. Furthermore, a purchasing account can be monitored. Thus, for example, purchases of stored value cards through use of a credit card or other stored value card may be marked as suspicious. Yet further, the enrollment analysis engine can in some cases check transaction information against data provided by the Office of Foreign Asset Control (OFAC).

The cross monitor provides an ability to monitor loads and enrollment transactions across multiple issuers. Such a cross monitor can overcome a narrow portfolio view used by issuers in suppressing fraudulent behavior. This is particularly useful in an environment where "open" stored value products are being offered. As used herein, an open stored value product can be a product that allows purchases of stored value cards by an unknown entity (e.g., someone that the issuer does not have a previous relationship with).

In some embodiments, the analysis engines and cross-monitor rely on a hierarchy of negative information files that are referred to herein as neg files. These neg files provide an issuer with multiple levels of protection. In particular, each product can have a product or program specific neg file. Such products and programs can include, for example, gift cards, incentive payments, payroll, and/or the like. Such neg files can include, but are not limited to, home telephone numbers, work telephone numbers, physical addresses of recipients and purchasers, BIN numbers of stored value products, and account numbers from which payment for stored value products are derived. In addition, such neg files can indicate a velocity of transactions in relation to any of the aforementioned information, and/or an indication of known or suspected prior fraudulent behavior.

Another neg file can include information related to a number of products and/or programs associated with a given issuer. Thus, an issuer can share information across products and/or programs. For example, information gathered from a payroll program can be shared with the data gathered from a gift card program, and/or information gathered in relation to one stored value program can be shared with the data gathered in relation to another stored value program. In some cases, the issuer can have full control over these neg files allowing an issuer to control what level of information is maintained and the time period for which the information is maintained.

Yet another neg file can be maintained by a third party such as a processor. In this neg file, information can be shared across issuers and across products and programs. Thus, for example, information useful in detecting suspicious behavior originating from a merchant point of sale device, an interactive voice response system, customer service, and/or third party web sites requesting money transfers, stored value card purchases, check validation services, and/or the like can be utilized. These three levels of neg files can be used to provide a screen that helps to prevent fraudulent activity that is occurring in relation to one issuer from spreading to other issuers. Thus, where an individual is identified as suspicious by one issuer, that individual can be prevented from entering transactions in relation to other issuers.

The response queue allows issuers to take corrective action on accounts where suspicious activity has been detected. In some cases, the response queue is an Internet based response queue that allows an issuer to be alerted of suspicious activity, and to take corrective action in real time. Such corrective action can include, for example, closing one or more accounts associated with the suspicious activity, alerting a customer associated with the accounts of the suspicious activity, and/or the like.

Particular embodiments of the present invention provide stored value fraud management systems that include two or more analysis engines, each associated with a particular stored value product. These analysis engines are responsible for monitoring activities ongoing local to the particular stored value product. Such systems further include a cross monitor that is operable to accept transaction information from one or more analysis engines, and to provide a convenient access point for the transaction information. In this way suspicious activity detected in relation to one analysis engine can be used to detect suspicious activity ongoing across other products and/or across multiple issuers. Thus, for example, transaction information gathered in relation to one analysis engine can be applied to authorizing a transaction associated with a stored value card unrelated to the analysis engine from which the gathered transaction information was received. In some cases, these systems can include some centralized database that maintains a group of transaction information. This transaction information can be graduated out of the system where it is not accessed or used for a long period of time and/or where it is found to be less relevant to detecting fraudulent activities.

In various cases, the suspicious activity can be a threshold velocity of transactions performed in relation to stored value cards. Thus, for example, suspicious activity may be defined to include the purchase of more than a preset number of stored value cards that are sent to a given physical address, the purchase of more than a preset dollar amount of stored value cards that are sent to a given physical address, the purchase of more than a preset amount of stored value cards associated with a given telephone number and/or virtual address, and/or some combination thereof or the like. These velocities can be calculated in relation to one particular stored value product, or across a number of stored value products and/or issuers.

In some instances, a queue is formed in relation to each issuer and/or stored value product. This queue can be used to hold a request for more information. Thus, for example, where suspicious activity is detected in relation to a stored value product, this suspicious activity can be identified in the queue and the issuer with access to the queue can monitor the information therein and approve or decline the continuance of such activity. In some cases where the issuer fails to authorize the transaction within a predetermined time period, the information in the queue is cleared, and the transaction is declined.

Other embodiments of the present invention provide methods for detecting fraud in relation to stored value products. Such methods include receiving suspicious activity indications from various issuer analysis engines. These issuer analysis engines are operable to monitor activities occurring in relation to stored value products associated with the respective issuers. The suspicious activity indications are maintained in a global negative file. An activity request including transaction information is received from one of the issuer analysis engines. Based at least in part on the transaction information, the global negative file is accessed and a response is provided indicating that the transaction information is related to suspicious behavior. In some cases, this response can be provided to a queue associated with one or more issuers to which the response is relevant. The response can include various of the following information: a date of the suspicious behavior, a funding account number, a denial reason, a review status, an indication of related accounts, and/or a reviewer note. Further, in some cases, this transaction information is used to create a velocity, and in turn, the velocity can be used to detect suspicious activity.

Turning to FIG. 1, a fraud detection and/or prevention system 100 in accordance with some embodiments of the present invention is illustrated. System 100 includes one or more stored value products 105 that can be purchased, reloaded, and/or used at one or more merchants 110. Merchants 110 are communicably coupled to an approval and settlement engine 120 that is responsible for receiving transaction information related to transactions ongoing in relation to stored value products 105. Approval and transaction engine 120 is communicably coupled to one or more issuers 115. These issuers 115 are associated with one or more of stored value products 105. As an example, issuer 115*a* is associated with two stored value products 105*a*, 105*b*, and issuer 115*b* is associated with one stored value product 105*c*. An analysis engine 125 is associated with each of the respective stored value products 105, and in the case of issuer 105*a*, a cross product engine is associated with both stored value product 105*a* and stored value product 105*b*. Further, a cross monitor 135 and a multi-service source 140 are associated with multiple issuers 115. Each of these engines, sources and monitors can be microprocessor based devices associated with computer readable media. Computer executable instructions can be maintained on the computer readable media that are executable to perform functions in relation to the methods more fully described below. Furthermore, the computer readable media can include the previously described neg files.

Figure 2A:
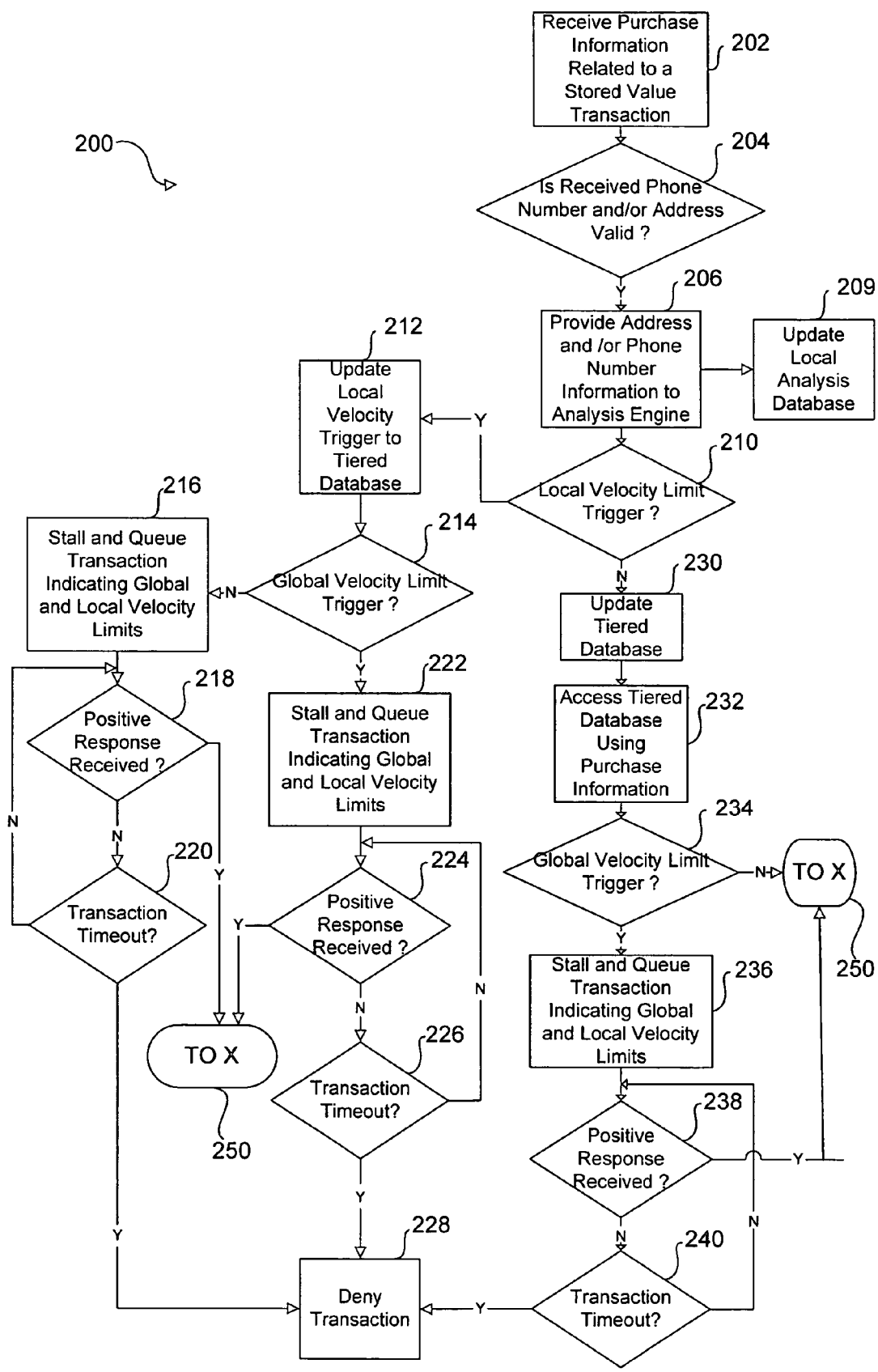
FIG. 2 are flow diagrams illustrating processes for fraud detection and/or prevention in accordance with various embodiments of the present invention.
Figure 2B:
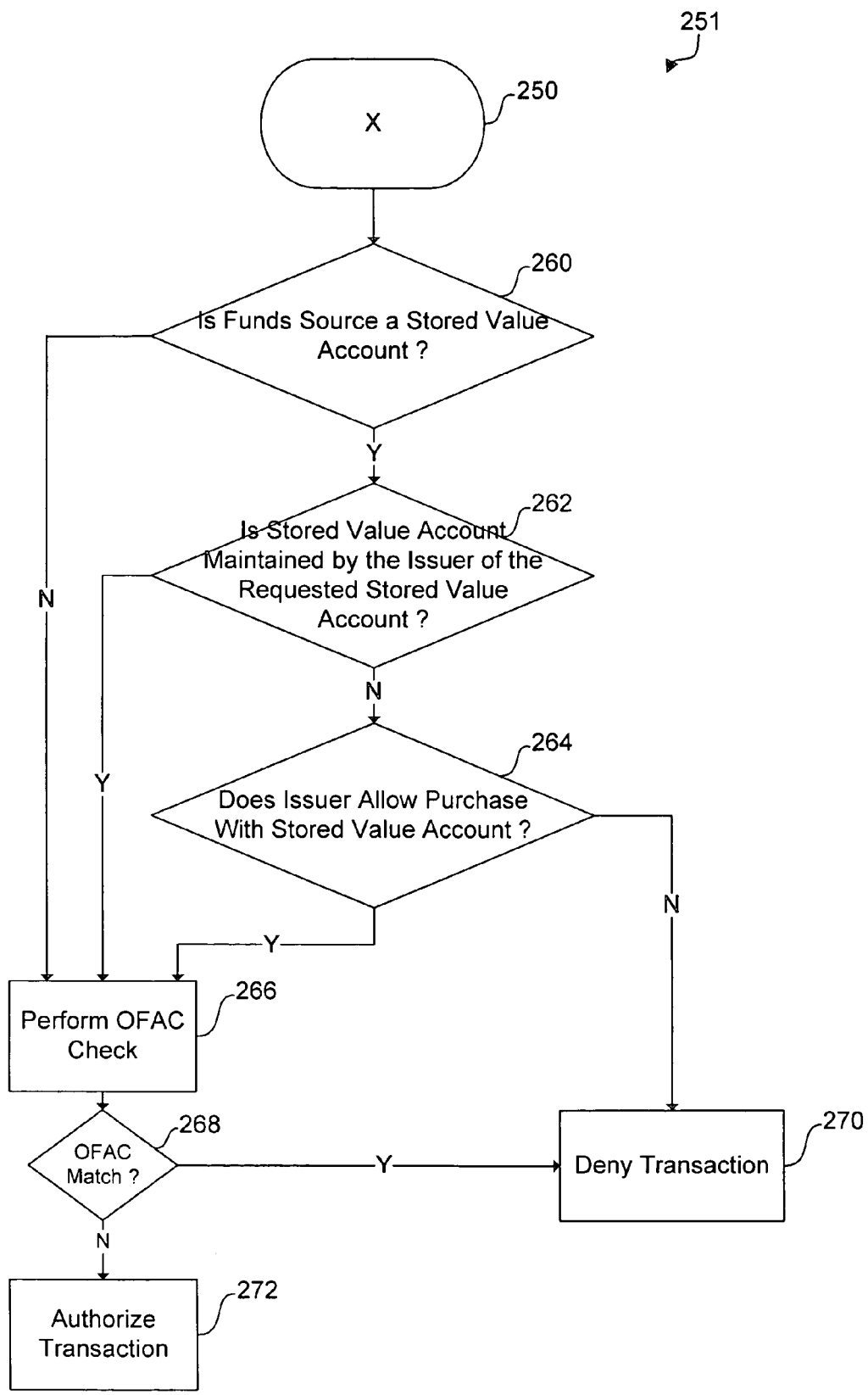

Turning to FIG. 2, a flow diagram comprising two flow diagram portions 200, 251 illustrates processes for fraud detection and/or prevention in accordance with various embodiments of the present invention. Following flow diagram portion 200, purchase information related to a stored value transaction is received (block 202). This information can include information related to a purchaser and information related to a recipient. Further, this information can be transferred to a database maintained by the issuer of the respective stored value product, to a database maintained in relation to the respective stored value product, and/or to third party database responsible for processing stored value transactions. The information garnered about one or both of the purchaser and the recipient can include, but is not limited to, name, physical address, virtual address, social security number, date of birth, funding account number, home telephone number, work telephone number, and the like.

A query is performed to determined if one or more elements of the aforementioned information is valid (block 204). In some cases, a customer may try to mask fraudulent behavior by varying the spelling of a physical address, a name, or the like. Thus, the information provided can be subjected to a number of variants, and the variants checked to determine if fraudulent activity is indicated in relation to any of the variants. Thus for example, a name can be reduced to a phonetic spelling, and the phonetic spelling compared against other phonetic names to which suspicious behavior has been identified. Additional information about such an phonetic approach can be found in one or both of U.S. patent application Ser. Nos. 10/091,000, entitled "Money Transfer Evaluation Systems and Methods", and filed Mar. 4, 2002; and Ser. No. 10/434,409, entitled "Systems and Methods for Graduated Suspicious Activity Detection", and filed May 7, 2003. Each of the aforementioned patent applications is assigned to an entity common hereto, and the entirety of each of the aforementioned patent applications is incorporated herein by reference for all purposes.

In one particular embodiment, variants of physical addresses are reduced to a common address, and the validity of the physical address is verified. Furthermore, the validity of the given telephone numbers is verified. In the embodiment, an XML request including the physical address is sent to a standardized validation engine (e.g., an address verification service). The validation engine utilizes the first eight characters of the address along with a zip code, and based on this returns an indication of address validity as well as a standardized form of the address. Thus, for example, Street, Drive and Avenue can all be changed to reflect a common spelling for these terms. Where the address is not valid (block 204), an error message is returned requesting the purchaser to re-enter a valid address.

Where the aforementioned information is determined to be valid (block 204), the information is passed to a local analysis database (block 208) associated with a local analysis engine (block 206). This analysis engine performs various velocity checks in relation to the information (block 210), and/or checks the information against locally known suspicious suspects. In one particular embodiment, a number of velocity checks are performed in relation to the received information. As just some examples, velocity checks can be performed to determine the number of transactions logged in relation to the recipient's telephone number, the account number from which payment is derived (e.g., the load source account number), total dollar amount purchased within a pre-determined amount of time from the load source account number, the number of transactions logged in relation to the recipient's physical address, the number of transactions logged in relation to the purchaser's physical address, and/or the like. In general, such velocity checks identify the amount of behavior associated with the information over a period of time. In some embodiments, each of a number of different velocity checks are configurable by an issuer, thus allowing the issuer to set threshold values at which point a velocity check becomes suspicious, and/or to define the information upon which the velocity checks will be performed.

Where the received information triggers one or more velocity check thresholds (block 210), the suspicious activity is updated to the tiered neg file system described above, the received information is updated to a database maintained by the issuer, and some portion of the information is provided to a third party to be used for cross issuer activity checking (block 212). Alternatively, where the none of the velocity check thresholds are met (block 210), the received information is updated to a database maintained by the issuer, and some portion of the information is provided to a third party to be used for cross issuer activity checking (block 230).

After updating the information to the tiered neg file (block 212) an additional check can be performed to determine if the information can be added to other global information (i.e., cross issuer information) to determine if any other velocity checks are triggered for the present issuer, or for any other issuer (block 214). This also includes checking the information against other known suspicious activity occurring across issuers. As will be appreciated by one of ordinary skill in the art, block 214 does not need to be performed to detect fraud in relation to the present transaction information, but can be used to detect fraud across a broader universe of transactions. This is supported in the exemplary embodiment where the processes occurring after the determination of the global velocity limit trigger are essentially the same.

After the global velocity limit trigger has been determined (block 214), the transaction is stalled (block 222, 216) based on one or both of a global velocity limit trigger (block 214) and the prior local velocity limit trigger (block 210). While the transaction is stalled, a message indicating the suspicious activity (e.g., the exceeded velocity limit(s)) is sent as part of a message to a queue associated with the issuer (block 222, 216). In some cases, this queue is an email address, while in other cases the queue is a shared electronic interface. Based on the disclosure provided herein, one of ordinary skill in the art will recognize a number of other implementations of such a queue.

A timer is started that defines a period in which the issuer has to respond either positively to allow the transaction to go forward, or negatively to cause the transaction to be denied (block 224, 218). Where the issuer responds negatively (block 224, 218), or where the time period expires (block 226, 220), the transaction is denied (block 228). Alternatively, where the issuer responds positively (block 224, 218), further processing designated as X is indicated (block 250).

Alternatively, where a local velocity trigger does not occur (block 210), the various neg files are accessed using the gathered transaction information (block 232). Based on the information obtained through this database access, it is determined if either the information is associated with previously identified suspicious and/or fraudulent behavior, or if the information in combination with other information in the database can be combined in a way that triggers a velocity limit (block 234). Where either of the aforementioned conditions is met, the transaction is stalled (block 236). While the transaction is stalled, a message indicating the suspicious activity (e.g., the exceeded velocity limit(s)) is sent as part of a message to a queue associated with the issuer (block 236). In addition, a timer is started that defines a period in which the issuer has to respond either positively to allow the transaction to go forward, or negatively to cause the transaction to be denied (block 238). Where the issuer responds negatively (block 238), or where the time period expires (block 240), the transaction is denied (block 228). Alternatively, where the issuer responds positively (block 224, 218), further processing designated as X is indicated (block 250). Also, where neither of the conditions is met (block 234), the transaction is stalled (block 236), further processing designated as X is indicated (block 250).

In some embodiments, rather than stall and queue the transaction (block 236) relying on a timer and/or some real time response to move the stalled transaction from the queue, the transaction can be presumptively declined and queued or approved and queued depending upon a preset selection of the card issuer. Additionally, the issuer can bypass this step altogether. Based on the option selected by the issuer, the issuer can log into the queue and review the various flagged transactions. The issuer can then decide to remove the previously identified suspicious fraudulent behavior and allow the transaction or, decide to let the decline or approval stand.

Upon reaching X (block 250), the velocity and neg file checks have successfully completed. At this point, the process continues as illustrated in flow diagram 251 of FIG. 2B. Flow diagram 251 illustrates the performance of a BIN match and a query to another third party database such as the OFAC database. Following flow diagram 251, the BIN check is performed to determine if the source of funds offered to complete the transaction is another stored value account (block 260). This can be determined by checking the BIN number of a card presented to complete the purchase. Further, it can be determined if a card presented to complete the transaction is associated with an entity providing the cross monitor function, or if the card is some out of network card (block 262). In some cases, an issuer will not allow use of other issuer branded stored value products, will not allow use of any stored value products at all, or will allow use of any stored value products. Thus, it will be appreciated by one of ordinary skill in the art that one or more of blocks 260, 262, 264 can be eliminated, and/or the results of such blocks modified.

Following the exemplary embodiment illustrated by flow diagram 251, where it is determined that funds to be exchanged in the transaction are from another stored value card (block 260), it is next determined if the stored value account is maintained by the same issuer that supports the stored value products that is to be purchased (block 262). Where the stored value product is not supported by the same issuer, it is determined if the issuer allows purchases using unrelated stored value cards (block 264). Where the issuer does not (block 264), the transaction is denied (block 270).

Otherwise, where any of the aforementioned blocks (blocks 260, 262, 264) are resolved in the alternative, a third party database check is performed to determine if any out of network fraud has been identified in relation to the transaction information (block 266). As just one example, this can include screening the transaction information against the OFAC database maintained by the United States Federal Government. In an exemplary embodiment, the check against the OFAC database is based on a first initial, a last name, and one or both of a social security number and a tax identification number. Based on this disclosure, one of ordinary skill in the art will understand a variety of other databases and/or search criteria that can be used in accordance with the present invention. Further, one of ordinary skill in the art will recognize that the third party database check (and for that matter a number of other steps in flow diagrams 200, 250) can be eliminated altogether.

Where the database used is the OFAC database, the check can be done in real time utilizing the following steps. The first initial, last name, and social security number or tax identification number are compared against the OFAC database. If no match is found (block 268), the transaction is allowed to complete (block 272). Otherwise, the transaction is denied (block 270). In some cases where the transaction is denied because of a match with the OFAC database, a status of the account is marked as frozen, a hold is placed on the account along with a reason for the hold, a memo is created about the hold that is placed in the issuer queue, and data about the transaction that caused the hold to be placed is updated to the OFAC data base. Such update data can include, but is not limited to, the transaction date, the account number, the reason for the match with the OFAC database, and the amount of the transaction. In some cases, the name address, telephone number and/or date of birth of both the recipient and purchaser are reported. Although in other cases, this information is not reported where privacy issues are a concern.

Where the transaction successfully completes the OFAC process (block 268), an authorization is provided, and the transaction is allowed to complete. To complete the transaction, the authorization is provided to the load source or merchant where the transaction is ongoing. Where the load source is supported by the processing entity providing the cross monitor, the transaction can be completed internal to the processing entity, otherwise, the transaction must be completed via third parties.

An issuer can control a number of parameters in relation to the various checks discussed above in relation to the flow diagrams 200, 251. These parameters can be controlled by one or more Internet webpage interfaces that can allow an issuer to interact with the processes in real time. Thus, for example, an issuer can select and/or modify velocities, one or more neg files associated with the issuer, and reporting queues used to receive information about suspicious activities. The settings selected by an issuer can be chosen to implement internal fraud and risk management procedures supported by the issuer. In some cases, a username and password are used to access the website and change various parameters. Further, in some cases one or more digital security certificates can be provided to an issuer that can be used to authenticate the issuer, and allow the issuer to access the website.

Figure 3:
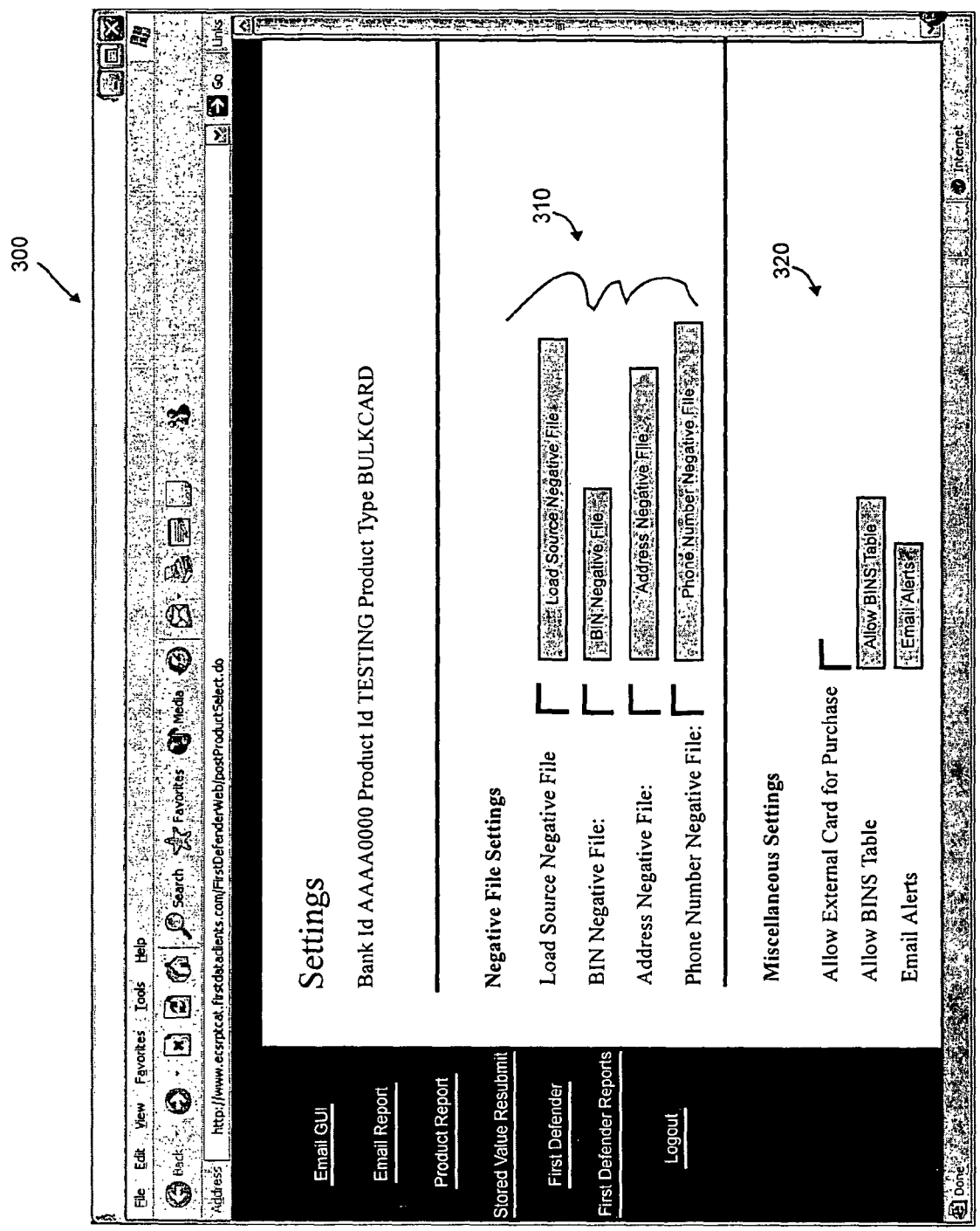
FIG. 3 illustrates a neg file control interface in accordance with some embodiments of the present invention.

FIG. 3 provides an exemplary implementation of an Internet webpage 300 in accordance with some embodiments of the present invention. Using webpage 300, an issuer can select one or more parameters 310 that the issuer desires to modify. Using webpage 300, an issuer (or other authorized user) can determine or select which neg files they wish to use as well as what velocity checks to perform, and the threshold for such velocity checks.

An extended view of webpage 300 is illustrated in FIG. 4 as webpage 400. By scrolling down on webpage 300, additional detail about the velocity checks and/or velocity thresholds is provided to the issuer. Using such an interface, an issuer is able to control the checks and thresholds used to check for suspicious activity by, for example, overriding velocity checks 312 and/or selecting different thresholds. Velocity check configuration 320 allows an issuer to establish velocity parameters on the following items: allow purchase through use of stored value cards; allow purchase through use of non-issuer stored value cards; allow purchase through credit cards; allow purchase through non-issuer credit cards; number of stored value loads allowed over a set period; number of transactions allowed in relation to a given home/work telephone number over a given time period; and number of transactions allowed in relation to a recipient and/or purchaser address over a given time period.

As previously discussed, where an authorization fails, a message indicating the failure is provided to an entity, such as an issuer, that has final authority to approve or deny a transaction. One such exemplary message 500 is depicted in FIG. 5. When an authorization fails, a message similar to that depicted in FIG. 5 is provided to the issuer, and a response is awaited. Such messages can be provided to an issuer via email and/or posted to a real time response queue accessible via an Internet webpage 600 as illustrated in FIG. 6. In particular embodiments, Internet webpage 600 provides the following information: date and time of attempted order 610, funding account number 620, deny reason 630, queue review status 640, and reviewer notes 650. To work each account, the user simply points and clicks on the account they wish to access.

When an account is selected through the aforementioned point and click process, a detailed account overview is provided. An exemplary overview 700 is depicted in FIG. 7. This overview includes the following information: purchaser address 705; recipient address 710; deny reason 715; reviewer notes 720; queue review status (Y/N) 725; update neg files query 730 including account file 732, BIN file 734, address file 736, and home telephone number file 738; update queue 740; Override Velocity 750 (causing an authorizing response overriding the velocity check to be issued); and a list of accounts related to the present account 760.

The list of accounts related to the present account 760 provides an issuer with an ability to place holds on a number of related accounts where suspicious activity is detected in relation to one account, or to a group of transaction information. This provides an issuer with time to more fully investigate without continuing fraud exposure. In other words, other cards may have been previously issued or in the process of issuing, and should also be invalidated along with the existing transaction under investigation. By freezing all accounts, an issuer is given time to find the various accounts that should also be invalidated, thus blocking a perpetrator from entering fraudulent activities in relation to the other accounts. Override Velocity 750 allows an issuer to override the various velocity checks on a case by case basis. Thus, for example, when a purchaser is purchasing a number of gift cards to be provided as holiday presents, the issuer can override the velocity check and allow this benign transaction to continue.

The invention has now been described in detail for purposes of clarity and understanding. However, it will be appreciated that certain changes and modifications may be practiced within the scope of the appended claims. For example, the invention is described in relation to stored value accounts, but the invention can be applied to a number of other account types. Accordingly, it should be recognized that many other systems, functions, methods, and combinations thereof are possible in accordance with the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. An account acquisition fraud management system, the account acquisition fraud management system comprising:
    a first analysis engine, wherein the first analysis engine is associated with a first stored value product;
    a second analysis engine, wherein the second analysis engine is associated with a second stored value product from a different issuer than an issuer of the first stored value product; and
    a cross monitor, wherein the cross monitor is operable to accept a first transaction information from the first analysis engine about a first transaction with the first stored value product and a second transaction information from the second analysis engine about a second transaction with the second stored value product, wherein the first transaction information is provided from the cross monitor to the second analysis engine; and
    wherein the second analysis engine is operable to recognize a common load source account to associate the transactions and determine a transaction velocity from the first and second transaction information, and stalling the second transaction when the transaction velocity exceeds a velocity threshold.

2. The system of claim 1, wherein the system further comprises:
    a computer readable medium accessible to the cross monitor, wherein the computer readable medium includes the first transaction information and the second transaction information.

3. The system of claim 1, wherein the first transaction information and the second transaction information are selected from a group consisting of:
    a physical address;
    a telephone number;
    a virtual address; and
    a load source.

4. The system of claim 1, wherein the cross monitor is further operable to maintain the first transaction information is a queue associated with an issuer of the second stored value card product.

5. A system for suppressing fraudulent activity in relation to account acquisition, the system comprising:
    a first load monitor associated with a first issuer;
    a second load monitor associated with a second issuer;
    a first enrollment monitor associated with the first issuer;
    a second enrollment monitor associated with the second issuer; and
    a cross monitor, wherein the cross monitor is operable to associate information from the first load monitor or first enrollment monitor, and the second load monitor or second enrollment monitor with a transaction using a first stored value product using common load source account information, and wherein the cross monitor is operable to determine a transaction velocity for the transaction using the information, and communicate the transaction velocity to both the first issuer and the second issuer.

6. The system of claim 5, wherein a request to load value on a stored value product associated with the first issuer is processed at least in part by the first load monitor.

7. The system of claim 6, wherein the first load monitor is operable to apply a velocity check on a load request.

8. The system of claim 5, wherein the first load monitor is further operable to compare the transaction velocity with a predefined velocity limit.

9. The system of claim 8, wherein the first load monitor is operable to provide a detected suspicious activity to the cross monitor.

10. The system of claim 9, wherein the detected suspicious activity is that the transaction velocity has exceeded the predefined velocity limit.

* * * * *